(12) United States Patent
Gibert et al.

(10) Patent No.: US 11,320,821 B2
(45) Date of Patent: May 3, 2022

(54) DRONE FOR INDUSTRIAL ACTIVITIES

(71) Applicant: AIRBUS HELICOPTERS, Marignane (FR)

(72) Inventors: Gauthier Gibert, La Fare les Oliviers (FR); Nicolas Imbert, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 538 days.

(21) Appl. No.: 16/216,273

(22) Filed: Dec. 11, 2018

(65) Prior Publication Data
US 2020/0183396 A1   Jun. 11, 2020

(51) Int. Cl.
  *G05D 1/00*   (2006.01)
  *B64C 39/02*  (2006.01)
  *B64D 1/18*   (2006.01)
  *B64D 47/08*  (2006.01)

(52) U.S. Cl.
  CPC ......... *G05D 1/0094* (2013.01); *B64C 39/024* (2013.01); *B64D 1/18* (2013.01); *B64D 47/08* (2013.01); *G05D 1/0038* (2013.01); *B64C 2201/126* (2013.01); *B64C 2201/127* (2013.01); *B64C 2201/141* (2013.01); *B64C 2201/146* (2013.01)

(58) Field of Classification Search
  CPC .. G05D 1/0094; G05D 1/0038; B64C 39/024; B64C 2201/126; B64C 2201/127; B64C 2201/141; B64C 2201/146; B64D 1/18; B64D 47/08
  See application file for complete search history.

(56) References Cited

U.S. PATENT DOCUMENTS

| 5,090,637 A * | 2/1992 | Haunschild | B64B 1/60 244/30 |
| 9,592,310 B1 * | 3/2017 | Hughes | A61L 2/035 |
| 9,984,579 B1 * | 5/2018 | Harris | H04L 51/20 |
| 10,160,541 B1 * | 12/2018 | Beckman | B64C 39/024 |
| 10,234,252 B2 * | 3/2019 | Kotenkoff | B64C 39/028 |
| 10,558,218 B2 * | 2/2020 | Tanaka | H04W 4/40 |

(Continued)

FOREIGN PATENT DOCUMENTS

| DE | 102015015742 B3 | 3/2017 |
| EP | 2520343 A2 | 11/2012 |

(Continued)

OTHER PUBLICATIONS

French Search Report for Application No. 1771120, Completed by the French Patent Office, dated Jun. 13, 2018, 6 pages.

*Primary Examiner* — Redhwan K Mawari
(74) *Attorney, Agent, or Firm* — Brooks Kushman P.C.

(57) ABSTRACT

An industrial activity drone comprising an aerial vehicle having at least one rotor, an activity system, and a fastener device for fastening the activity system to the aerial vehicle. The activity system includes a structure, a computer, a work camera that is stationary relative to the aerial vehicle and that provides a view of a work zone, a distribution device having a plurality of compartments, and a turning motor enabling the distribution device to turn relative to the aerial vehicle. The industrial activity drone performs hovering flight so that the work camera faces a work zone and the distribution device is turned so that the compartment that is to be used faces the work zone, thereby performing one or more tasks.

17 Claims, 5 Drawing Sheets

(56) References Cited

U.S. PATENT DOCUMENTS

| | | | | |
|---|---|---|---|---|
| 2014/0353422 | A1* | 12/2014 | Westbrook, Sr. | B64D 9/00 |
| | | | | 244/17.21 |
| 2015/0041593 | A1* | 2/2015 | Markov | B64D 1/02 |
| | | | | 244/137.1 |
| 2016/0260207 | A1* | 9/2016 | Fryshman | G06K 9/6267 |
| 2017/0022078 | A1* | 1/2017 | Fukuoka | C02F 1/68 |
| 2017/0075351 | A1* | 3/2017 | Liu | G05D 1/0011 |
| 2017/0210451 | A1* | 7/2017 | Oh | B63C 9/01 |
| 2017/0291439 | A1* | 10/2017 | Koyata | B41J 3/4073 |
| 2018/0105254 | A1* | 4/2018 | Tian | B64C 39/024 |
| 2019/0004543 | A1* | 1/2019 | Kennedy | H04N 5/2171 |
| 2019/0161190 | A1* | 5/2019 | Gil | B65G 1/0435 |
| 2019/0220039 | A1* | 7/2019 | Wu | B64C 39/024 |
| 2020/0019189 | A1* | 1/2020 | Chen | G08G 5/0069 |
| 2020/0351440 | A1* | 11/2020 | Seta | H04N 5/23227 |

FOREIGN PATENT DOCUMENTS

| | | | | |
|---|---|---|---|---|
| EP | 2899491 | A1 | 7/2015 | |
| WO | 2015173627 | A1 | 11/2015 | |
| WO | 2016100601 | A2 | 6/2016 | |
| WO | 2016159481 | A1 | 10/2016 | |
| WO | WO-2017096548 | A1 * | 6/2017 | G01C 21/00 |

* cited by examiner

DRONE FOR INDUSTRIAL ACTIVITIES

The present invention relates to the field of working on zones that are difficult to access, or indeed on zones that are dangerous, or even hostile, for an operator.

The present invention relates to a drone for industrial activities that is capable of performing various tasks during a flight over a zone that is difficult to access or indeed a zone that is dangerous, or even hostile, for an operator.

The term "drone" is used generically to designate an aircraft of various kinds without a pilot on board. By way of example, a drone may have a fixed wing and may use various types of propulsion such as one or more jets or indeed one or more propellers. A drone may also have one or more rotary wings, also referred to as "rotors", that contribute to providing the drone with lift and/or propulsion. A drone having one or more rotors serves in particular to perform hovering flight or flight at low speeds of advance, as well as cruising flight.

Each rotor may be driven in rotation by a motor in independent manner and may be controlled by a centralized control system. By way of example, a drone as conventionally used nowadays may have three, four, six, eight or twelve rotors. Each rotor is preferably driven by an electric motor, however it could be driven by a fuel-burning engine.

In addition, a drone may either be controlled remotely by an operator acting as a pilot, in which case the drone has at least one camera and at least one communications device, or else it may fly autonomously, the drone then having positioning, navigation, and autopilot devices. In order to be autonomous, a drone needs in particular devices that enable it to position itself in its surroundings, so that it can travel while taking account of the relief and the obstacles in its vicinity.

By way of example, a device for positioning the drone in its surroundings may be a laser beam locating device known as a light detection and ranging (Lidar) device, and/or an ultrasound locating device. A locating device may also be a radio altimeter in order to define the height of the drone above the ground.

As its positioning device, a drone may also have at least one gyro so as to be able to position and orient itself in three-dimensional space, and consequently so as to be able to stabilize itself by controlling each rotor in appropriate manner.

Finally, a drone may include a satellite locating device, such as a global positioning system (GPS) receiver that enables the drone to position itself in a terrestrial reference frame.

Furthermore, the size of a drone may vary from a few centimeters to several meters, or even more, and its weight from a few grams to several tons, depending on the missions for which the drone is intended.

The use of drones was initially limited essentially to military services and to leisure activities, but it is now becoming extended to civilian professional applications, e.g. for taking aerial photographs. As a result of rapid and varied technological developments, resulting in particular from the miniaturization of the above-mentioned positioning devices and also of communications devices, drones nowadays have significant application opportunities opening up for them.

For example, Document WO 2016/100601 describes a drone having a camera device and methods of managing such a drone to take photographs of targets selected by means of a display device displaying the images supplied by the camera device.

Document WO 2015/173627 describes an aerostatic platform in the form of a balloon suitable for rising to various heights and intended mainly for supporting antennas in order to transmit data and also to support aerial surveying devices. The balloon is anchored to the ground by a mooring cable device that is actuated to allow the balloon to rise or to descend.

This recent widespread availability of drones has nevertheless required national regulations to be put into place in numerous countries in order to govern the use of drones, in particular as a function of their size and/or their weight.

A drone may be considered as an aerial vehicle carrying equipment, and in this respect it may comprise firstly a basic aerial vehicle that enables the drone to fly, i.e. that enables the drone to be propelled and sustained in the air and to position itself in its surroundings and to navigate, and secondly an onboard activity system that is intended to perform one or more tasks, such as pointing a camera and taking photographs.

The term "aerial vehicle" is used below to designate that portion of the drone that enables it to fly.

The prior art also includes applications in the field of searching for targets, and in particular in the field of saving accident victims.

For example, Document US 2014/0353422 discloses a remotely controlled drone comprising a main rotor and a tail rotor, a camera, an antenna for transmitting data, and lifesaving equipment. The lifesaving equipment may comprise a winch provided with a cable suitable for transporting the person to be rescued. That lifesaving equipment may also include equipment that can be dropped, e.g. a first aid kit for the person to be rescued.

Likewise, Document WO 2016/159481 describes a drone having a plurality of lift and propulsion rotors together with a device for dropping lifesaving equipment, e.g. for a person in the sea. The drone also has a camera in order to detect the presence of such a person and a device for releasing lifesaving equipment so as to drop the lifesaving equipment in the proximity of that person.

Document EP 2 520 343 describes a drone that serves to search for a target by detecting a signal transmitted by the target. The target is detected as a function of the magnitude of the signal received by the drone. A detected target may be located by transmitting its coordinates as determined by the onboard locating device. The drone may also include marker means for marking the position of the detected target, e.g. serving to deposit paint, a smoke generator, or a sound beacon. That application relates in particular to searching for accident victims, and in particular following an avalanche.

Furthermore, in the military field, Document EP 2 899 491 describes a small-sized flying unit configured to fly at low altitude and including a marker device provided with a specific transmitter for designating a target. The flying unit may land with its transmitter on the target, e.g. such as a tank or a mine, or else it may merely place the transmitter on the target in order to enable a missile to be guided to the target by means of the transmitter. The flying unit may also carry an explosive charge which it triggers in the proximity of a target.

Furthermore, Document US 2015/0041593 describes a drone that is designed to release insects in the proximity of predefined zones. The drone is remotely controlled, and in each zone it releases a container full of insects. The drone has a plurality of rotors and sensors, e.g. a camera, together with a distribution device for distributing containers full of insects. The distribution device has an external portion with an opening, an internal portion configured to turn relative to the external portion and having container-receiving locations, and an actuator for turning the internal portion relative to the external portion.

Furthermore, Document DE 10 2015 015742 describes a drone for examining an accident zone and for acting on that zone. The drone may be remotely controlled or it may fly autonomously. The drone has a camera and a device for analyzing images picked up by the camera. The drone also has a plurality of containers that may contain foam and/or paint of various colors for marking the ground in the accident zone, together with cleaning agents for cleaning the zone. The drone thus includes a spray device for spraying foam, paint, and/or cleaning agents.

Finally, Documents US 2016/0260207 and US 2017/0291439 are also known, and form part of the technological background of the invention.

The object of the present invention is thus to overcome the above-mentioned limitations and to propose a drone for industrial activities that can be deployed simply and quickly and that can perform various tasks during a flight of that drone in work zones that are difficult of access, dangerous, or indeed hostile for an operator.

In this context, the present invention provides an activity drone comprising:
 an aerial vehicle having at least one rotor participating in providing the drone with lift and/or propulsion;
 an activity system; and
 a fastener device for fastening the activity system to the aerial vehicle.

The aerial vehicle enables the drone to fly, i.e. provides the drone with propulsion and lift and also enables it to be positioned in its surroundings and to navigate. The aerial vehicle may be capable of autonomous flight, or it may be remotely controlled by an operator. In this context, the aerial vehicle includes at least one lift and propulsion rotor and a centralized control system provided at least with devices for positioning it in its surroundings, and navigation and autopilot devices and also communications devices. Where appropriate, the aerial vehicle includes at least one flight camera in order to enable it to be remotely controlled by an operator. The aerial vehicle preferably includes at least three rotors. By way of example, the aerial vehicle has three, four, six, eight, or twelve rotors. Consequently, the activity drone of the invention can perform hovering flight or flights at a low speed of advance, as well as cruising flights at higher speeds.

Each rotor is driven in rotation in independent manner and is controlled by the centralized control system so as to cause the drone to move and so as to stabilize it. Each rotor is preferably driven by an electric motor, however it could also be driven by a fuel-burning engine.

The aerial vehicle also has at least one source of energy for driving each rotor in rotation, but also for powering the centralized control system. For this purpose, the aerial vehicle preferably includes one or more electric batteries.

The aerial vehicle may advantageously be a standard aerial vehicle, i.e. an already existing and commercially available aerial vehicle, thereby requiring no development cost and/or specific fabrication.

The activity drone of the invention is remarkable in that the activity system comprises:
 a structure;
 a computer;
 at least one work camera that is stationary relative to the aerial vehicle and that provides a view of a work zone; and
 a distribution device for performing a plurality of tasks in succession, the distribution device having a plurality of compartments, each respectively containing at least one object, at least one task being associated with each compartment.

The activity system is thus capable of performing a plurality of tasks during a flight of the activity drone, and in particular during hovering flight facing a work zone.

Each work camera is stationary relative to the aerial vehicle and thus always points towards the work zone during hovering flight. Each work camera then enables an operator situated remotely from the work zone to be able to view the work zone. Each work camera may also serve to keep a record of the tasks performed by the activity drone, with the activity system then including a device for recording images picked up by each work camera.

It is then possible to perform "post-treatment" of the recorded images, e.g. in order to extract measurements and/or to perform digital processing such as image and shape recognition in order specifically to look for predefined particular shapes.

At least one work camera may be shared with the aerial vehicle, such that it also constitutes a flight camera to enable the activity drone to be remotely piloted by an operator so as to limit the weight of the activity drone. Such a work and flight camera may for example be arranged on the aerial vehicle, or indeed on the structure of the activity system.

Nevertheless, each work camera may be dedicated to the activity system, with the focal length(s) necessary for performing the intended tasks potentially not being compatible with flying safely. Furthermore, the activity system may comprise a plurality of work cameras of different focal lengths, e.g. serving firstly to provide a wide-angle view of the work zone and secondly to provide a close-up view of a specific portion of the work zone. The activity system may equally well comprise a single work camera having variable focal length, enabling both a wide-angle view of the work zone to be obtained and also a close-up view of a specific portion of the work zone.

The activity system may also include a lighting system in order to light the work zone. By way of example, the lighting system may be provided with one or more light-emitting diodes (LEDs), or with any other lighting device.

The aerial vehicle of the activity drone of the invention includes at least one rotor capable of performing stable hovering flight. Under such circumstances, in order to perform one or more tasks, the activity drone performs stable hovering flight so that the work camera remains facing the work zone.

Advantageously, the positioning device of the activity drone, such as a laser beam locating device or indeed an ultrasound locating device, enables the activity drone to position itself facing its surroundings and in particular at a predetermined distance from the work zone, thereby guaranteeing firstly a safe distance between the work zone and the activity drone and secondly a distance that enables the intended tasks to be performed on the work zone.

The use of the distribution device makes it possible to perform a plurality of tasks in succession on the work zone, while the activity drone remains in stable hovering flight in front of the work zone. Furthermore, each of the compartments of the distribution device contains one or more respective objects for performing tasks on the work zone.

As a result, the use of a distribution device serves advantageously to save time compared with turning the entire activity drone. Specifically, the drone enables stable hovering flight to be maintained while the distribution device is turning relative to the aerial vehicle. In contrast, turning the entire activity drone with the distribution device then being stationary relative to the aerial vehicle, would require extra time to stabilize hovering flight in the new position and would therefore lengthen the time required for performing the various tasks.

Furthermore, the activity drone of the invention can easily reach work zones that are difficult to access or indeed dangerous for an operator. The activity drone thus enables actions to be taken in work zones that are difficult to access, e.g.:

top zones of an airplane, e.g. a tail fin;
top zones of monuments or indeed of pylons;
bridge decks and pillars; and
the structure of an oil rig.

The activity drone also makes it possible to take action in work zones that are dangerous or indeed hostile for an operator, such as for example work zones that might contain toxic gas.

The activity drone thus makes it possible to take action involving a plurality of tasks while taking the place of an operator and without installing complex infrastructures to enable an operator to reach the work zone and/or to make it safe for the operator.

The activity system is preferably positioned under the aerial vehicle, thereby enabling the center of gravity of the activity drone to be well centered.

The structure of the activity system can support other elements of the activity system, in particular the computer and the distribution device. The structure may also constitute fixed landing gear for the activity drone, i.e. landing gear that is not retractable, serving advantageously to enable the drone to be autonomous so as to enable it to stand in stable manner on the ground without damaging its components and in particular the rotors of the aerial vehicle. As a result, the drone of the invention can take off and land autonomously directly relative to the ground. Furthermore, this structure also serves to protect the other components of the activity system, in particular the computer and the distribution device.

In the absence of landing gear, the drone of the invention would require an operator to hold the drone during takeoff and to catch the drone during landing in order to avoid any damage to the drone.

The structure of the activity system may for example be made of composite materials or indeed of plastics materials in order advantageously to limit the weight of the structure while providing sufficient rigidity for the structure and consequently for the activity system. The structure may also be made out of metal materials, e.g. out of aluminum.

The activity system of the activity drone of the invention may include a turning motor for enabling the distribution device to turn relative to the aerial vehicle. As a result, the turning motor serves to position the compartment that is to be used for performing a task in a predetermined utilization position relative to the work zone. Thereafter, in order to move on to performing a new task on the same work zone, the turning motor serves advantageously to turn the distribution device relative to the aerial vehicle and relative to the work zone so that a new compartment for use occupies in turn the predetermined utilization position, the activity drone performing hovering flight so as to be substantially stationary facing the work zone. The turning motor serves advantageously to pass each compartment in succession into the predetermined utilization position relative to the work zone in order to perform those tasks on the work zone.

This predetermined utilization position of each compartment relative to the work zone may for example be a position situated facing the work zone.

The structure may be stationary relative to the aerial vehicle and relative to the work camera. Under such circumstances, the turning motor is preferably arranged between the structure and the distribution device, and serves to turn the distribution device relative to the structure and the aerial vehicle. The fastener device then serves to provide a connection between the structure of the activity system and the aerial vehicle.

The structure may be secured to the distribution device and thus be movable in turning relative to the aerial vehicle and relative to the work camera. Under such circumstances, the turning motor is preferably arranged between the structure and the aerial vehicle so as to enable the distribution device and the structure to turn relative to the aerial vehicle. The fastener device then serves to provide a connection between the turning motor of the activity system and the aerial vehicle.

The turning motor optionally comprises an electric motor, e.g. a stepper motor.

The activity drone is generally piloted remotely by an operator in order to reach the work zone and then return to its starting base or else go to a return point.

The activity drone may then include a communications device firstly in order to receive commands from the operator and secondly in order to transmit images taken by the flight camera. The communications device also serves to transmit the images taken by each work camera to an operator situated remotely from the work zone and to receive work commands issued by the operator in order to perform tasks.

In known manner, the communications device is connected to the computer of the activity system via a wired or wireless connection. The computer then serves to respond to the work commands so as to control the turning motor in order to bring each compartment of the distribution device into position in such a manner that the compartment that is to be used occupies the predetermined utilization position. The computer of the activity system then enables such work commands to control the distribution device and in particular the compartment that is to be used in order to perform one or more tasks. For this purpose, the computer is connected to the turning motor, and where necessary to the distribution device via a wired or wireless connection.

The computer of the activity system can also deliver commands to the aerial vehicle and in particular to the centralized control system of the aerial vehicle, firstly to enable the drone to reach the work zone quickly and autonomously, with the coordinates of the zone being supplied beforehand to the drone, and secondly to enable the drone to return to its starting base or else to go to a return point, likewise of coordinates that have been supplied to the drone, after finishing its action or else when the remaining onboard energy is not sufficient to continue taking action. For this purpose and in known manner, the computer of the activity system is connected to the centralized control system of the aerial vehicle via a wired or wireless connection. Furthermore, the activity drone may include a locating device, such as a GPS receiver, enabling the activity drone to be located in a terrestrial reference frame.

The computer may also include an image analysis device configured to analyze the images supplied by each work camera and to perform tasks autonomously. In addition, the computer may include means from the field of artificial intelligence enabling it to learn from experience as it analyses images and as it takes actions. As a result, the computer is suitable for taking decisions following image analysis in order to provide increasingly better performance.

In addition, the computer of the activity system may be offset into the aerial vehicle, and for example it may be integrated in the centralized control system of the aerial vehicle. As a result, the computer is shared between the activity system and the aerial vehicle so as to limit the weight of the drone.

Furthermore, the activity system may include an energy source, such as an electric battery, with the activity system then being independent in terms of energy supply.

The activity system need not include an energy source and it may make use of at least one energy source of the aerial vehicle for the purpose of electrically powering the computer, each work camera, the turning motor, and the distribution device, and also each of its compartments, should that be necessary. This common use of energy sources by the aerial vehicle and by the activity system may serve advantageously to optimize the weight of the activity drone of the invention.

The activity drone of the invention is preferably of small dimensions and weight so as to enable it to be transported easily close to the work zone. Furthermore, these small dimensions in weight may also serve to limit regulatory restrictions to which the activity drone of the invention might be subjected.

The weight of the drone of the invention may for example be less than or equal to three kilograms (3 kg), with the activity system weighing about 1 kg. Its dimensions may for example comprise a height of about 0.3 meters (0.3 m) and a width and a length of about 1 m.

Furthermore, the fastener device for fastening the activity system to the aerial vehicle preferably enables the aerial vehicle and the activity system to be connected together and separated quickly, thereby limiting the size of the drone of the invention when it is disassembled, and thus making it easier to transport. Furthermore, the aerial vehicle is also preferably suitable for being taken apart.

As a result, the activity drone of the invention may advantageously be taken easily, e.g. by a carrier, to a site that requires it to take action. Thereafter, the activity system can be assembled quickly with the aerial vehicle so as to form the activity drone of the invention, which can therefore be made operational quickly.

Finally, the action to be taken by the activity drone may be performed without the presence of an expert on site, it being possible for the expert to analyze its conduct or indeed its results after the event. Its action may also be monitored remotely by an expert while it is taking place, the drone possibly being remotely piloted by the expert. Either way, the cost of taking action remains limited and it can be undertaken quickly without requiring the involvement of an expert over a long period and without requiring major infrastructure.

By way of example, a fastener device may comprise at least one nut-and-bolt fastener, or indeed merely one or more screws for holding the activity system to the aerial vehicle. Since the weight of the activity system is low, the fastener device could also be formed by self-gripping strips, e.g. as known under the trade name "Velcro®", with a male self-gripping strip being secured by way of example to the aerial vehicle and a female self-gripping strip being secured to the activity system.

Any other fastener means suitable for providing a reliable and easily separable connection may be used for the fastener device that provides fastening between the aerial vehicle and the activity system.

Furthermore, the activity system is also easily and quickly interchangeable in order to adapt the activity drone to the action that needs to be taken, e.g. to go from a mission of analyzing corrosion to a mission of analyzing the toxicity of a gas coming from a leak.

By way of example, the activity system may also be a system for searching for and marking a target, e.g. in order to search for avalanche victims. Under such circumstances, the activity system includes at least one target detection device, i.e. a device for detecting a victim, and the distribution device is adapted to distribute a marker element for each detected target, with each compartment of the distribution device being for the purpose of containing a respective marker element, such as colored powder or indeed paint.

Furthermore, the activity system may include a common unit that is used in common by a plurality of compartments of the distribution device. The use of a common unit by a plurality of compartments enables the common unit to be shared with those compartments and thus makes it possible to optimize the weight of the activity system, and consequently to optimize the weight of the activity drone. The computer also serves to control the common unit as a function of work commands it receives.

In a first embodiment of the activity drone of the invention, the activity system includes a turning motor enabling the distribution device to turn relative to the aerial vehicle so that the compartment that is to be used for performing a task occupies a predetermined utilization position relative to said work zone. The common unit includes a pressure generator, while the objects contained respectively in a plurality of compartments are a fluid and a spray nozzle such that when one of the compartments containing a fluid and a spray nozzle is occupying the predetermined utilization position for performing a task, the activity system uses the pressure generator to spray the fluid through the spray nozzle of the compartment onto the work zone. The turning motor of the activity system in this first embodiment enables the compartment to be put into position prior to being used in the predetermined utilization position, which is generally situated facing the work zone. Where necessary, and depending on the activity that is to be performed, the fluid could be replaced with a powder suitable for being delivered via the spray nozzle.

In this first embodiment, the common unit may also include a valve system for connecting together the fluid in the compartment that is to be used and the pressure generator of the common unit, the valve system being controlled by the computer. As a result, the valve system enables the pressure generator to act on the fluid and to direct the fluid to the spray nozzle of the compartment that is in use.

In this first embodiment, the structure of the activity system may be secured to the distribution device and may be turnable relative to the aerial vehicle and to the work camera, the common unit then preferably being secured to the structure of the distribution device.

The structure of the activity system may also be stationary relative to the aerial vehicle, with the distribution device then being movable relative to the structure and to the aerial vehicle. The common unit may then be secured to the structure, the valve system enabling the fluid of the compartment that is to be used to be connected to the pressure generator of the common unit, the compartment being movable relative to the pressure generator. The common unit may also be secured to the distribution device.

This first embodiment of the activity drone of the invention may in particular be used for performing chemical analysis with a plurality of fluids on the work zone, e.g. in order to verify the state of degradation of a bridge or indeed of a monument. This first embodiment is particularly well adapted to analyzing the state of the corrosion of metal elements of a bridge, of a monument, or indeed of an airplane. This first embodiment serves in particular to apply a plurality of fluids on the work zone in order to analyze the presence of corrosion, and where appropriate, the type and the depth of that corrosion.

A work camera serves to verify the effect of spraying the fluid on the work zone and in particular the chemical reaction that might occur in order to deduce the level of degradation of the work zone, where applicable. As mentioned above, the work camera may be of variable focal length or it may be adapted to provide a close-up view of the specific portion of the work zone where the fluid was sprayed.

This first embodiment of the activity drone of the invention serves advantageously to perform such analysis at low cost, since there is no need for the expert to be on site in order to perform the analysis. Such analysis makes it possible in particular to perform pre-diagnosis in order to estimate the state of corrosion prior to sending a team for the purpose of treating the corrosion in appropriate manner, should that be necessary.

Furthermore, some kinds of corrosion can be harmful for humans. For example, this applies to corrosion on wiring harness connectors. Under such circumstances, the first embodiment of the activity drone of the invention serves advantageously to analyze the corrosion of such elements remotely, thereby avoiding any risk of contact between an operator and this type of corrosion.

The activity drone of the invention may also be adapted to analyze any other type of degradation, e.g. analyzing funguses and other growths that might be found on engineering structures.

In a second embodiment of the activity drone of the invention, the common unit comprises a pressure generator and a single spray nozzle, while respective objects contained in a plurality of compartments include a fluid such that when one of the compartments including a fluid is to be used, the activity system uses the pressure generator to spray that fluid through the spray nozzle of the common unit onto the work zone. The common unit may also include a valve system for connecting the fluid of the compartment to the pressure generator and to the spray nozzle, the valve system being controlled by the computer. As a result, the valve system enables the pressure generator to act on the fluid and serves to direct it to the spray nozzle of the common unit. Under all circumstances, the spray nozzle of the common unit is pointed by means of the aerial vehicle towards the work zone.

In a first variant of this second embodiment, the distribution device is stationary relative to the aerial vehicle. The valve system of the common unit connects the fluid in each compartment respectively and continuously to the pressure generator, the computer then controlling the valve system so as to open valves in the system appropriately to cause the fluid in the compartment that is to be used to be directed to the spray nozzle.

In a second variant of the second embodiment, the distribution device is turnable relative to the aerial vehicle, the activity system including a turning motor for turning the distribution device relative to the aerial vehicle so that the compartment that is to be used for performing a task occupies a predetermined utilization position relative to said work zone. Under such circumstances, the valve system of the common unit serves to connect the fluid in the compartment situated in the predetermined utilization position to the pressure generator and the spray nozzle of the common unit.

In this second variant of the second embodiment, the structure of the activity system is preferably stationary relative to the aerial vehicle and the work camera, with the common unit then being secured to that structure. The turning motor thus serves to turn the task distribution device relative to the structure, to the aerial vehicle, and to the common unit.

This second embodiment of the activity drone of the invention may serve in particular for performing chemical analysis using a plurality of fluids on the work zone, as in the first embodiment.

In a third embodiment of the activity drone of the invention, the activity system includes a turning motor enabling the distribution device to be turned relative to the aerial vehicle so that the compartment that is to be used for performing a task occupies a predetermined utilization position relative to said work zone. The common unit comprises an articulated arm such that when one of the compartments containing at least one object is occupying the predetermined utilization position in order to perform a task, the articulated arm can take hold of an object contained in the compartment in order to perform the task. The structure of the activity system is preferably stationary relative to the aerial vehicle and to the work camera, with the common unit, i.e. the articulated arm, then being secured to that structure. The turning motor then serves to cause the task distribution device to turn relative to the structure, to the aerial vehicle, and to the common unit.

By way of example, an object contained in any one of a plurality of compartments may comprise a fabric impregnated with a substance that is to react with a specific gas in order to analyze air and detect the presence, if any, of a specific gas, and in particular a toxic gas. As a result, after each turn of the distribution device, the articulated arm can take hold in succession of the various pieces of fabric impregnated with different substances that are contained in the compartments and can present them to the proximity of the work zone where the presence of one or more toxic gases is suspected, e.g. as a result of a leak. Advantageously, the presence of one or more gases may be revealed without risk for an operator.

In addition, an object contained in a compartment of the distribution device may also be a tool that can be used by the articulated arm of the common unit.

Thus, the activity drone of the invention advantageously makes it possible to perform various tasks quickly, while limiting the means and thus the costs that are engaged. Firstly, the drone of the invention gives quicker access to a work zone, regardless of its access conditions. Thereafter, an expert can monitor the action remotely, thereby contributing to limiting the cost of taking action. Finally, the activity drone of the invention can be adapted quickly and easily to the tasks that are to be performed, since the activity system is interchangeable.

The invention and its advantages appear in greater detail from the following description of embodiments given by way of illustration and described with reference to the accompanying figures, in which.

Figure 1:
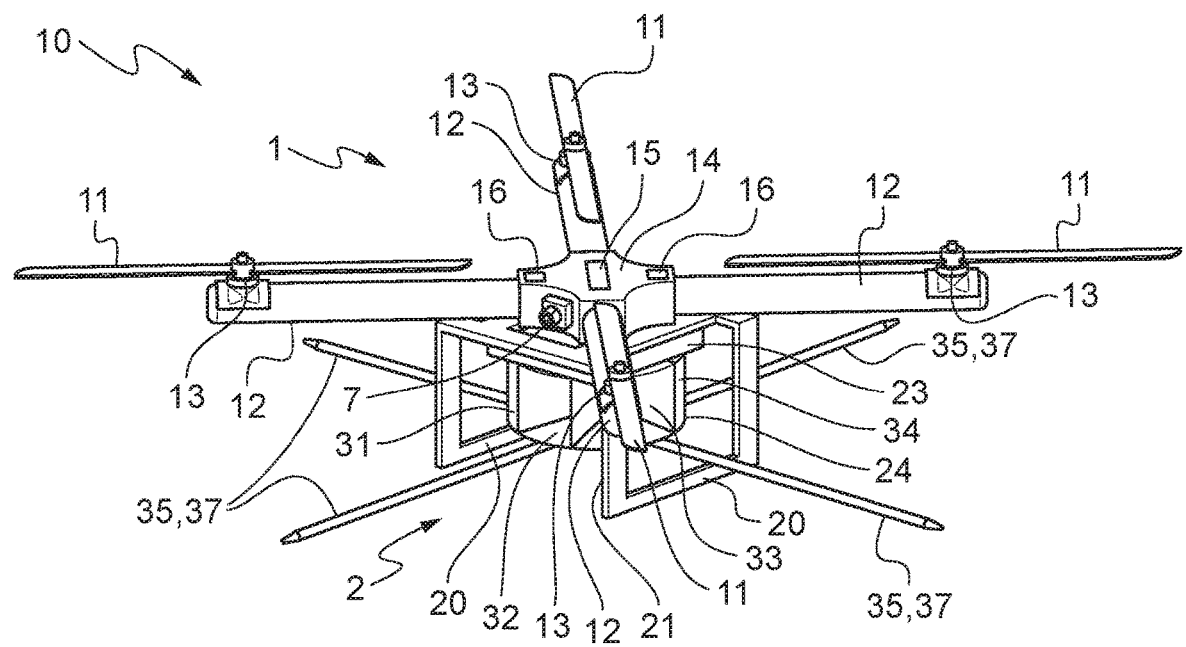
FIGS. 1 to 3 show various embodiments of an activity drone.

Elements shown in more than one of the figures are given the same references in each of them.

In a manner that is common to the three embodiments shown in the figures, an activity drone 10 comprises an aerial vehicle 1, an activity system 2, and a fastener device 3 for fastening the activity system 2 to the aerial vehicle 1. The aerial vehicle 1 and the fastener device 3 are identical for all three embodiments of an activity drone 10.

The aerial vehicle 1 shown in the figures has four rotors 11, each rotor 11 being driven in rotation by a respective electric motor 13 and contributing to providing the activity drone 10 with lift and propulsion. Each rotor 11 is installed at the end of a respective arm 12, each arm 12 being connected to a central body 14. The central body 14 connects together the four arms 12 and also provides the rigidity needed for the aerial vehicle 1. The central body 14 has a centralized control system 15 and two electric batteries 16.

The arms 12 and the central body 14 can be separated and reassembled easily and quickly in order to limit the overall size of the aerial vehicle 1 while it is being transported.

Regardless of whether piloting involves an autopilot or is remotely controlled, the centralized control system 15 serves to pilot the activity drone 10 by acting on the electric motors 13 driving each of the rotors 11 so as to cause the activity drone 10 to move and/or hover, and also so as to stabilize it in flight. The centralized control system 15 is connected to each electric motor 13 by a wired connection or indeed by a wireless connection, and it includes in particular devices for positioning the activity drone 10 in its surroundings, and also navigation and control devices, and indeed a communications device.

The activity system 2 of the three drones 10 for activities comprise in common:
  a structure 21;
  a computer 23;
  a work camera 7 that is stationary relative to the aerial vehicle 1 and that provides a view of a work zone;
  a common unit 40;
  a distribution device 24 for performing a plurality of tasks in succession in the work zone and having a plurality of compartments 31, 32, 33, 34, each containing one or more objects 35; and
  a turning motor 29 enabling the distribution device 24 to be turned relative to the aerial vehicle 1.

The turning motor 29 allows the distribution device 24 to turn relative to the aerial vehicle 1 so that the compartment 31, 32, 33, 34 that is to be used occupies a predetermined position relative to the work zone, with the work zone corresponding to the field of view of the work camera 7.

The work camera 7 also constitutes a flight camera enabling an operator remotely piloting the activity drone 10 to view the surroundings of the activity drone 10. For this purpose, the activity drone 10 uses the communications device of the centralized control system 15 of the aerial vehicle 1. The work camera 7 may also be steerable, firstly in order to make it easier to view the work zone, and secondly in order to point its field of view in the flying direction of the activity drone 10 when the work camera 7 constitutes a flight camera.

Furthermore, in all three embodiments of the activity drone 10, the structure 21 may constitute fixed landing gear 20 advantageously enabling the activity drone 10 to stand in stable manner on the ground while protecting the components of the activity system 2.

Figure 4:
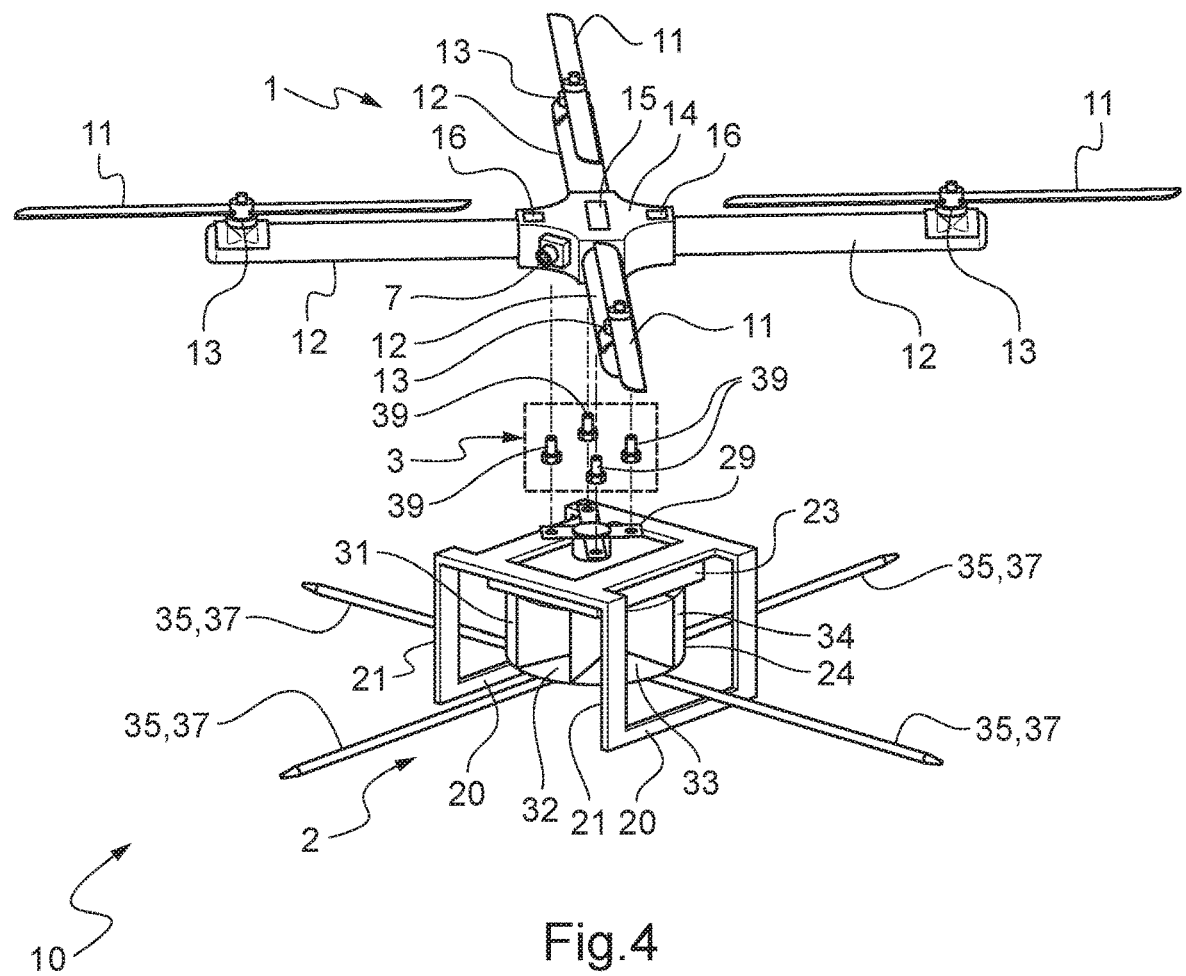
FIGS. 4 to 7 are detailed views of those embodiments of an activity drone.
Figure 5:
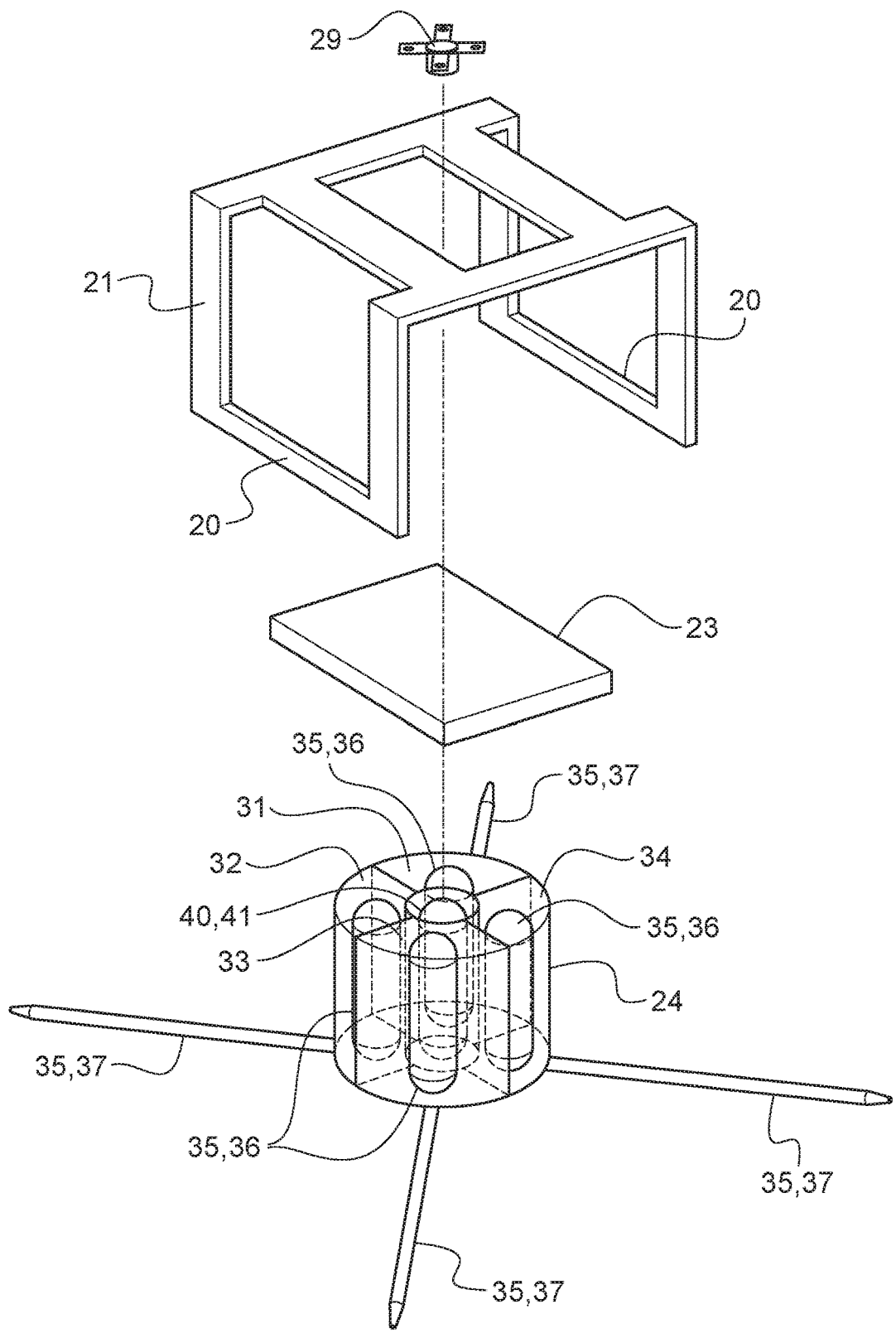

The first embodiment of the activity drone 10 is shown in FIGS. 1 and 4, with its activity system 2 being shown in an exploded view in FIG. 5. Each compartment 31, 32, 33, 34 contains two objects, namely a spray nozzle 37 and a tank 36 containing a fluid. The common unit 40 includes a pressure generator 41 and a valve system (not shown) for connecting the fluid of the compartment 31, 32, 33, 34 that is to be used with the pressure generator 41, the valve system being controlled by the computer 23. As a result, the valve system serves to enable the pressure generator 41 to act on the fluid and to direct it towards the spray nozzle 37 of the compartment 31, 32, 33, 34 in use so as to spray the fluid on the work zone.

In this first embodiment, the turning motor 29 is arranged between the structure 21 and the aerial vehicle 1, as shown in FIG. 4, thereby enabling the distribution device 24 and the structure 21 to turn relative to the aerial vehicle 1. The fastener device 3 then provides a connection between the turning motor 29 and the central body 14 of the aerial vehicle 1 via four screws 39.

Specifically, the work camera 7 is fastened on the aerial vehicle 1, and in particular on its central body 14 so as to be able to view the work zone while the activity drone 10 is hovering, and regardless of the position of the distribution device 24.

By way of example, the common unit 40 is situated at the center of the distribution device 24 as shown in FIG. 5 so that the valve system connects the pressure generator 41 with the fluid in each compartment 31, 32, 33, 34.

Figure 2:
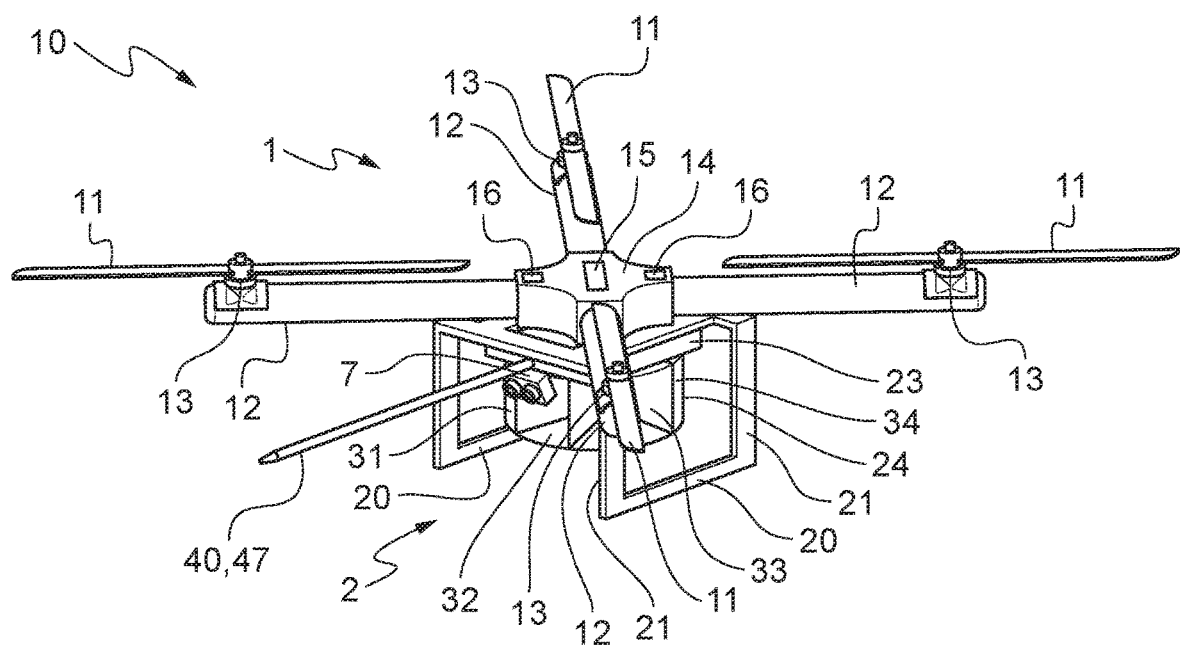
Figure 6:
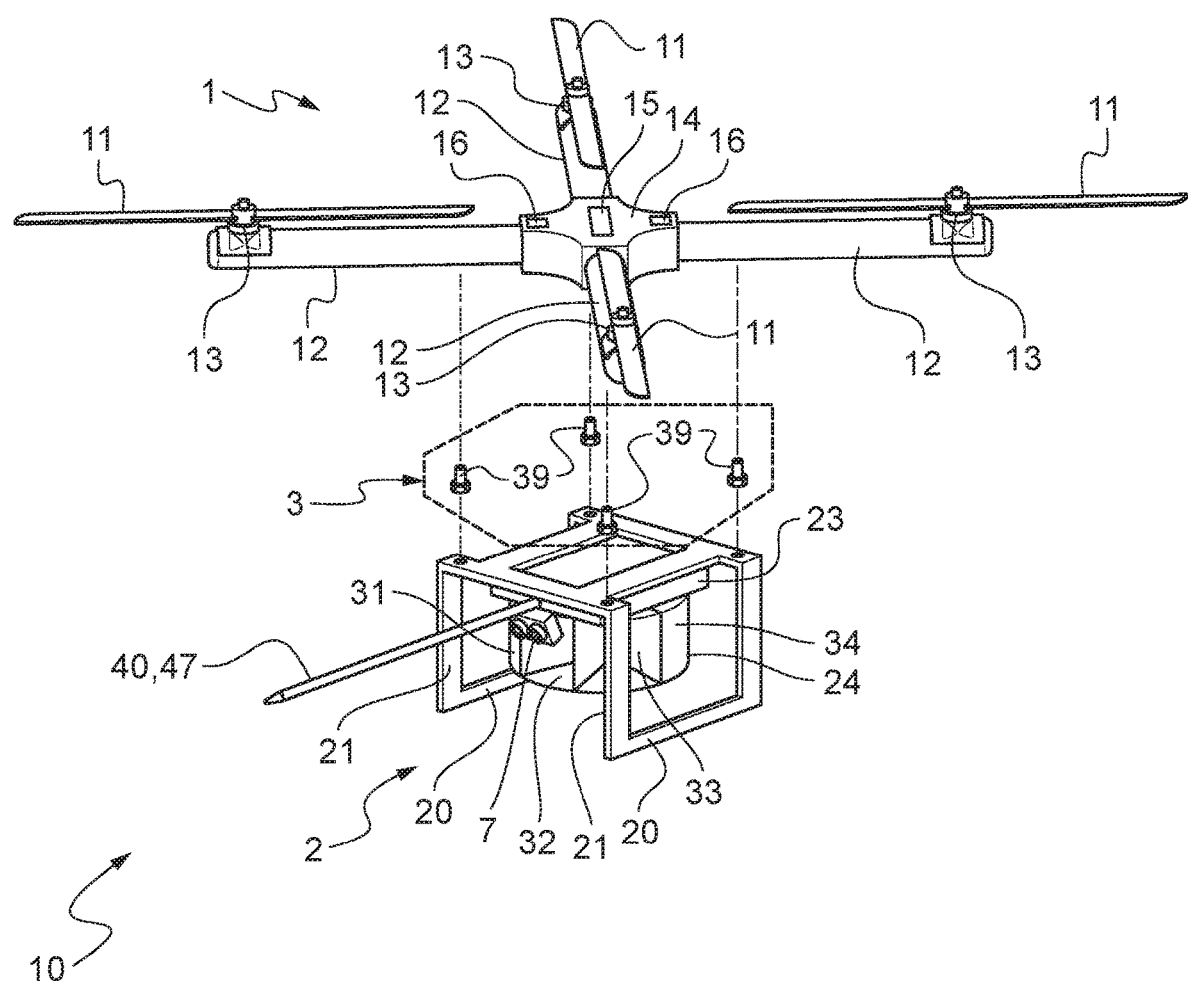
Figure 7:
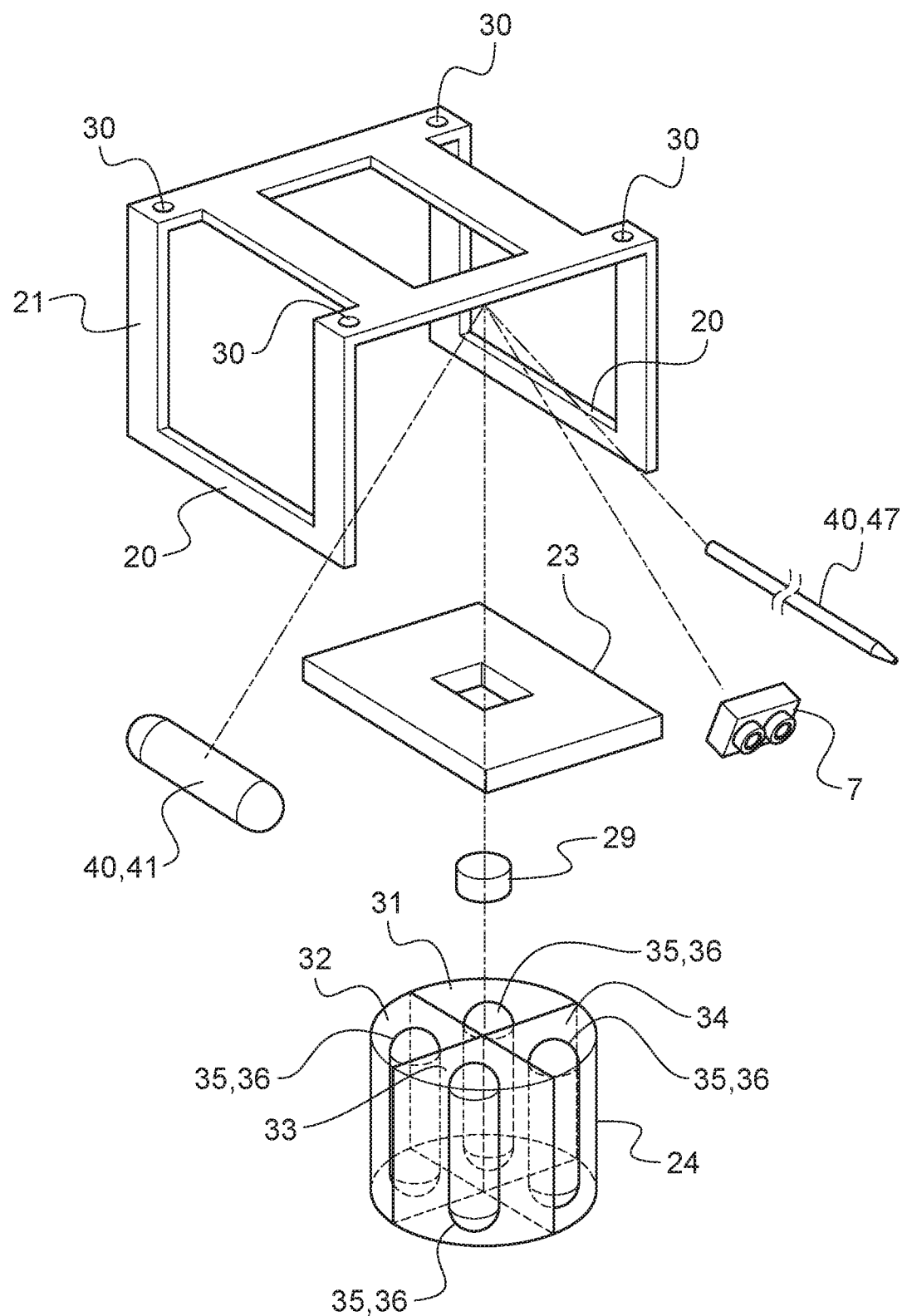

The second embodiment of the activity drone 10 is shown in FIGS. 2 and 6, with an exploded view of an activity system 2 being shown in FIG. 7. Each compartment 31, 32, 33, 34 contains a single object 35, namely a tank 36 containing a fluid. The common unit 40 has a single spray nozzle 47, a pressure generator 41, and a valve system (not shown). The valve system connects the fluid of the compartment 31, 32, 33, 34 that is to be used with the pressure generator 41 and the spray nozzle 47 of the common unit 40, the valve system being controlled by the computer 23. As a result, the valve system enables the pressure generator 41 to act on the fluid of the compartment 31, 32, 33, 34 that is in use and serves to direct it to the spray nozzle 47 of the common unit 40 in order to spray the fluid on the work zone.

In this second embodiment, the turning motor 29 is arranged between the structure 21 and the distribution device 24, thus enabling the distribution device 24 to turn relative to the structure 21 and the aerial vehicle 1. The structure 21 is thus stationary relative to the aerial vehicle 1, the fastener device 3 providing a connection between the structure 21 and the arms 12 of the aerial vehicle 1 by means of four screws 39 as shown in FIG. 6, the structure 21 having four holes 30.

The work camera 7 is fastened to the structure 21 and is therefore stationary relative to the aerial vehicle 1 so as to be able to view the work zone while the activity drone 10 is hovering and regardless of the position of the distribution device 24.

The common unit 40, namely the spray nozzle 47, the valve system, and the pressure generator 41, is secured to the structure 21 so that the valve system serves firstly to connect the pressure generator 41 with the fluid in the compartment 31, 32, 33, 34 in use, and secondly to connect the fluid of the compartment 31, 32, 33, 34 that is in use with the spray nozzle 47. The valve system is then controlled by the computer 23 so that the pressure generator 41 acts on the fluid in the compartment 31, 32, 33, 34 that is to be used and to direct it to the spray nozzle 47 of the common unit 40 in order to spray the fluid on the work zone.

In a variant of this second embodiment, the distribution device 24 may be stationary relative to the structure 21 and the aerial vehicle 1. Under such circumstances, the activity system 2 does not include the turning motor 29.

These first and second embodiments of the activity drone 10 are intended in particular for performing chemical analysis with a plurality of fluids on the work zone, e.g. in order to verify the state of degradation, or indeed the state of corrosion, of a bridge or indeed of a monument, for example.

Figure 3:
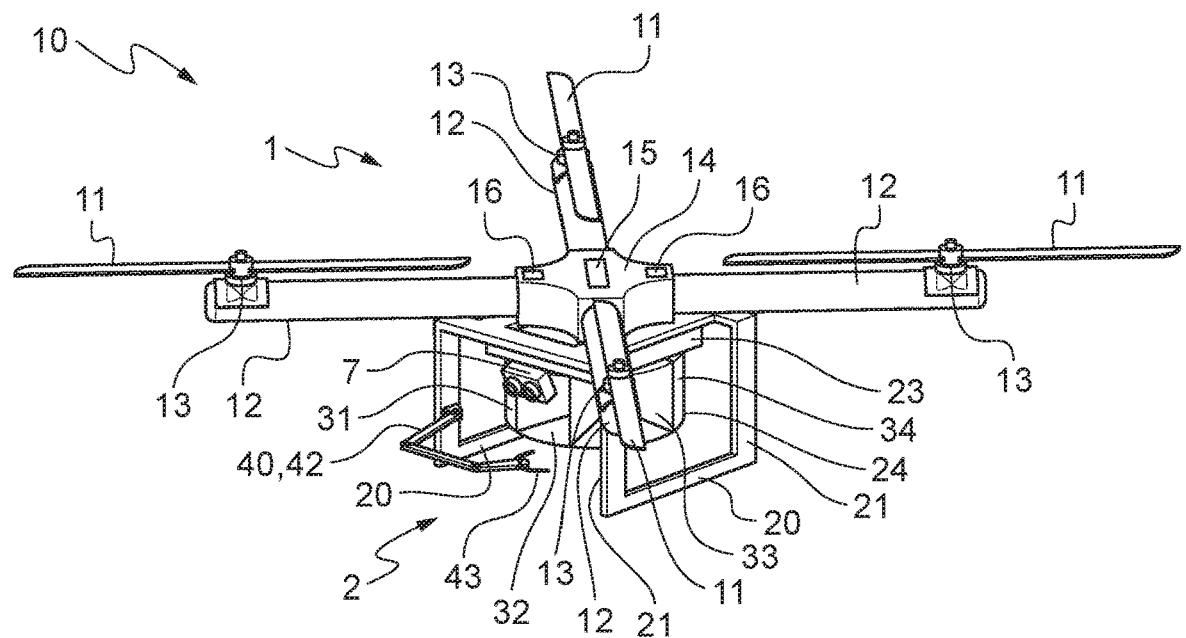

In the third embodiment of the activity drone 10, shown in FIG. 3, each compartment 31, 32, 33, 34 may contain one or more objects 35. The common unit 40 comprises an articulated arm 42 with a gripper clamp 43. The articulated arm 42 can then use the gripper clamp 43 to take hold of an object situated in the compartment 31, 32, 33, 34 that is to be used and then position that object in the proximity of the work zone. By way of example, the object is a tool or a fabric impregnated with a substance that reacts with a specific gas.

As in the second embodiment, the structure 21 is stationary relative to the aerial vehicle 1 and the turning motor 29 is arranged between the structure 21 and the distribution device 24 so as to allow the distribution device 24 to turn relative to the structure 21 and the aerial vehicle 1. The fastener device 3 thus connects the structure 21 with the arms 12 of the aerial vehicle 1, and the camera 7 is fastened to the structure 21.

The common unit 40, namely the articulated arm 42 is also fastened to the structure 21.

Naturally, the present invention may be subjected to numerous variations as to its implementation. Although several embodiments are described, it will readily be understood that it is not conceivable to identify exhaustively all possible embodiments.

In particular, although the description relates solely to an activity drone 10 comprising an aerial vehicle 1 having four arms 12 and four rotors 11, the invention applies equally to an activity drone 10 having a aerial vehicle 1 provided with three, six, eight, or twelve arms 12 and three, six, eight, or twelve rotors 11, for example.

Likewise, the fastener device 3 may comprise any fastener means providing a reliable and easily releasable connection between the aerial vehicle 1 and the activity system 2.

Naturally, it is possible to envisage replacing any of the devices described by an equivalent device without going beyond the ambit of the present invention.

The invention claimed is:

1. An activity drone comprising:
   an aerial vehicle having at least one rotor contributing to providing the drone with lift and/or propulsion;
   an activity system; and
   a fastener device for fastening the activity system to the aerial vehicle;
   the activity system comprising:
      a structure;
      a computer;
      at least one work camera that is stationary relative to the aerial vehicle and that provides a view of a work zone that is apart from the activity drone; and
      a distribution device for performing a plurality of tasks in succession on the work zone, the distribution device having a plurality of compartments, each compartment containing at least one object, at least one task being associated with each compartment;
   wherein the activity system includes a turning motor enabling the distribution device to be turned relative to the aeria l vehicle so that the compartment that is to be used for performing a task occupies a predetermined utilization position relative to the work zone,
   wherein respective objects contained in the plurality of compartments are various pieces of fabric impregnated with different substances for reacting with different specific gases so as for each piece of fabric to analyze the air in the work zone and detect in the air in the work zone a possible presence of the specific gas reactive with the substance of that piece of fabric,
   wherein the activity system further includes an articulated arm, and after each turn of the distribution device relative to the aerial vehicle, the articulated arm takes hold and presents in succession the various pieces of fabric to a proximity of the work zone for each piece of fabric to analyze the air in the work zone and detect in the air in the work zone a possible presence of the specific gas reactive with the substance of that piece of fabric.

2. The activity drone according to claim 1, wherein the structure is stationary relative to the aerial vehicle and to the work camera, the turning motor serving to cause the distribution device to turn relative to the structure and to the aerial vehicle.

3. The activity drone according to claim 1, wherein the structure is stationary relative to the distribution device, the turning motor enabling the distribution device and the structure to turn relative to the aerial vehicle.

4. The activity drone according to claim 1, wherein the activity system includes a common unit that is used in common by the plurality of compartments for performing the plurality of tasks.

5. The activity drone according to cla im 4, wherein the common unit includes a pressure generator and a spray nozzle, while respective objects contained in the plurality of compartmentsfurther include a respective fluid so that when one of the compartments including a fluid is being used to perform a task, the activity system sprays the fluid contained in the compartment through the spray nozzle of the common unit onto the work zone.

6. The activity drone according to claim 4, wherein the activity system includes the turning motor enabling the distribution device to turn relative tothe aerial vehicle so that the compartment that is to be used for performing the task occupies the predetermined utilization position relative to the work zone, and the common unit includes a pressure generator, while respective objects contained in the plurality of compartments further include a fluid and a spray nozzle in such a manner that when one of the compartments containing a fluid and a spray nozzle is occupying the predetermined utilization position for performing the task, the activity system sprays the fluid through the spray nozzle of the compartment onto the work zone.

7. The activity drone according to claim 1, wherein the computer includes an image analysis device configured to analyze images taken by each work camera and to perform the task in an autonomous manner.

8. The activity drone according to claim 1, wherein the structure forms fixed landing gear.

9. The activity drone according to claim 1, wherein the activity drone includes a communications device in order to receive commands from an operator and in order to transmit to the operator imagestaken by each work camera.

10. The activity drone according to claim 1, wherein the activity drone includes a locating device so as to position itself in a terrestrial reference frame.

11. The activity drone according to claim 1, wherein the activity drone includes positioning devices enabling the drone to position itself in its surroundings so as to be able to move in an autonomous manner.

12. An activity drone comprising:
an aerial vehicle having at least one rotor to provide the drone with lift;
an activity system; and
a fastener fastening the activity system to the aerial vehicle;
the activity system comprising:
a structure;
a computer;
at least one work camera to provide a view of a work zone that is apart from the activity drone; and
a distribution device to perform a plurality of tasks in succession on the work zone, the distribution device having a plurality of compartments, with each compartment containing an object, with at least one task associated with each compartment;
wherein the activitysystem includes a turning motor to turn the distribution device relative to the aerial vehicle so that the compartment that is to be used for performing a task occupies a predetermined utilization position relative to the work zone,
wherein the objects contained in the plurality of compartments are various pieces of fabric impregnated with different substances for reacting with different specific gases so as to analyze the air in the work zone and detect a possible presence of one or more of the specific gases in the work zone,
wherein the activity system further includes an articulated arm, and after each turn of the distribution device relative to the aerial vehicle, the articulated arm takes hold and presents in succession the various pieces of fabric to a proximity of the work zone for each piece of fabric to analyze the air in the work zone and detect in the air in the work zone a possible presence of the specific gas reactive with the substance of that piece of fabric.

13. The activity drone according to claim 12, wherein the structure is stationary relative to the aerial vehicle and to the work camera, the turning motor serving to cause the distribution device to turn relative to the structure and tothe aerial vehicle.

14. The activity drone according to claim 12, wherein the structure is stationary relative to the distribution device, the turning motor enabling the distribution device and the structure toturn relative to the aerial vehicle.

15. The activity drone of claim 1, wherein the articulated arm has a gripper clamp for use in taking hold of and presenting the various pieces of fabric to the proximity of the work zone.

16. The activity drone of claim 1, wherein the distribution device turns about a rotational axis of the rotor when being turned relative to the aerial vehicle.

17. The activity drone of claim 12, wherein the articulated arm has a gripper clamp for use in taking hold of and presenting the various pieces of fabric to the proximity of the work zone.

* * * * *